United States Patent
Daianu et al.

(10) Patent No.: US 11,429,405 B2
(45) Date of Patent: Aug. 30, 2022

(54) METHOD AND APPARATUS FOR PROVIDING PERSONALIZED SELF-HELP EXPERIENCE

(71) Applicant: INTUIT INC., Mountain View, CA (US)

(72) Inventors: Madelaine Daianu, San Diego, CA (US); Yao Morin, San Diego, CA (US); Ling Feng Wei, San Diego, CA (US); Chris Peters, San Diego, CA (US); Itai Jeczmien, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 1311 days.

(21) Appl. No.: 15/824,883

(22) Filed: Nov. 28, 2017

(65) Prior Publication Data

US 2019/0163500 A1    May 30, 2019

(51) Int. Cl.

| | |
|---|---|
| *G06F 9/451* | (2018.01) |
| *G06N 3/08* | (2006.01) |
| *G06Q 40/00* | (2012.01) |
| *H04L 67/306* | (2022.01) |
| *G06F 3/048* | (2013.01) |
| *H04L 51/52* | (2022.01) |

(52) U.S. Cl.
CPC .............. *G06F 9/453* (2018.02); *G06F 3/048* (2013.01); *G06N 3/08* (2013.01); *G06Q 40/10* (2013.01); *G06Q 40/123* (2013.12); *H04L 51/52* (2022.05); *H04L 67/306* (2013.01)

(58) Field of Classification Search
None
See application file for complete search history.

(56) References Cited

U.S. PATENT DOCUMENTS

| | | |
|---|---|---|
| 2007/0292833 A1 | 12/2007 | Brodie et al. |
| 2010/0235343 A1 | 9/2010 | Cao et al. |
| 2012/0265800 A1 | 10/2012 | Tuchman et al. |
| 2015/0227592 A1 | 8/2015 | Govindaraju et al. |
| 2016/0239738 A1 | 8/2016 | Feng et al. |

OTHER PUBLICATIONS

International Search Report/ Written Opinon issued in PCT/US2018/045377 dated Nov. 26, 2018.

*Primary Examiner* — Evren Seven
(74) *Attorney, Agent, or Firm* — Patterson & Sheridan, LLP

(57) ABSTRACT

Method and apparatus for providing personalized self-help experience in online application. A predictive model is trained to learn a relationship between one or more user features and one or more tags using historical user feature data. High-dimensional vectors representing each of a plurality of questions are generated and stored in the lookup table. The trained predictive model outputs tags probabilities from the incoming user data, using the learned relationship. A user high-dimensional vector is formed based on the tags probabilities. Similarity metrics are calculated between the high-dimensional vector for the respective question and the user high dimensional vector. One or more of the most relevant question titles are returned to a client device for presentation to a user.

20 Claims, 6 Drawing Sheets

Personalized Q&A List

1. Question 1
2. Question 2
3. Question 3
4. Question 4
5. Question 5
6. Question 6
7. Question 7
8. Question 8
9. Question 9
10. Question 10

View More->

Search Q&A

402

400

| Summary | Personal Info | Federal Taxes | State Taxes | eFile |

Personal Info : Name, Address

Filing Status : Single

Adjusted Gross Income : $50,000

Federal Refund : $1000

Forms Entered or Imported: W2, 1099-INT, 1099-G

Deduction Taken : Home mortgage, Medical expenses

Credits Taken : Earned income credit

Back Account : Checking Account #*********

Fig. 4

METHOD AND APPARATUS FOR PROVIDING PERSONALIZED SELF-HELP EXPERIENCE

FIELD

The present disclosure generally relates to method and apparatus for providing personalized self-help experience in online application. In particular, the present disclosure provides a predictive model capable of learning a relationship between user features and tags with their probabilities through a machine training process using historical user feature data, predicting tag probabilities from the incoming user data. Then, similarity metrics are calculated between high-dimensional vectors for questions and a user high-dimensional vector generated based on the tag probabilities, and one or more of the most relevant question titles are returned to a client device for presentation to a user.

DESCRIPTION OF THE RELATED ART

In today's digital age, computer application users expect highly personalized features and dynamically enhanced end-to-end user experiences. Since users sometimes encounter complex and unique issues while using online applications, generating a personalized self-support knowledge base that addresses these issues can be challenging.

As such, there exists a need for an improved approach to suggesting personalized and relevant questions and answers for customers without the need for human-assisted help.

SUMMARY

In one aspect, a system for personalizing a self-support service in an online application coupled with an online application forum, includes a transmitter for transmitting data and a receiver for receiving data, and a processor configured to: train a predictive model through a machine training process to learn a relationship between one or more user features and one or more tags based on historical user feature data; extract a plurality of tags from the online community forum containing a plurality of question-answer pairs; create high-dimensional representation of each tag based on a contextual relationship of each tag within the online community forum by using a neural network model; map each respective question of the plurality of question-answer pairs to a set of tags; form high-dimensional vectors for each respective question of the plurality of question-answer pairs based on the set of tags mapped to the respective question; cause the receiver to obtain user data when an online user takes actions within an online application; map the user data to one or more of the tags; predict, by the predictive model, tag probabilities for the online user based on the user data; put weights on respective high-dimensional representations of each tag of the tag probabilities by respective tag probabilities; average the weighted high-dimensional vectors of tags of the tag probabilities into a user high-dimensional vector; calculate a plurality of similarity metrics, wherein each respective similarity metric of the plurality of similarity metrics measures the similarity between the high-dimensional vector for a respective question and the user high-dimensional vector; and provide one or more of the plurality of question-answer pairs to the user based on the plurality of similarity metrics.

In one embodiment, the processor is further configured to train a predictive model through a machine training process to learn a relationship between one or more user features and one or more tags based on historical user feature data, wherein the historical user feature data comprise at least one of user profiles, clickstreams, e-file statuses, a tab and/or subtab selection on a web page of the online application, or user inquiries.

In another embodiment, wherein the historical user features data are normalized to a magnitude scale between 0 and 1 to ensure that each data are comparable across data types including of the e-file statuses, the tab and/or subtab selection on a web page of the online application, and the user profiles.

In yet another embodiment, each respective question of the plurality of question-answer pairs is parsed to extract tags therefrom through a natural language process.

In yet another embodiment, each respective question of the plurality of question-answer pairs is represented as a high-dimensional vector by encoding unique weights for the tags in a form of probabilities, using a neural probabilistic language model.

In yet another embodiment, training the predictive model comprises training a model prediction module to predict tag probabilities from a set of a user profile and a clickstream, and training a model correlation to establish correlations between tags of each respective questions, and subtab context and an e-file status that the user has historically been associated with.

In yet another embodiment, each of the plurality of similarity metrics is calculated based on a size of a respective angle between the high-dimensional vector for the respective question and the user data vector in terms of cosine similarity.

In another aspect, a computer-implemented method includes training a predictive model through a machine training process to learn a relationship between one or more user features and one or more tags based on historical user feature data; extracting a plurality of tags from the online community forum containing a plurality of question-answer pairs; creating high-dimensional representation of each tag based on a contextual relationship between each tag and other words in the online community forum by using a neural network model; mapping each respective question of the plurality of question-answer pairs to a set of tags; forming high-dimensional vectors for each respective question of the plurality of question-answer pairs by averaging the high-dimensional representation of the set of tags into a final high-dimensional vector; obtaining user data when an online user takes actions within the online application; predicting, by the predictive model, tag probabilities based on the user data for the online user by running a predictive model; putting weights on respective high-dimensional representations of each tag of the tag probabilities by respective tag probabilities; averaging the weighted high-dimensional vectors of tags of the tag probabilities into a user high-dimensional vector; calculating a plurality of similarity metrics, wherein each respective similarity metric of the plurality of similarity metrics measures the similarity between the high-dimensional vector for a respective question and the user high dimensional vector; and providing one or more of the plurality of question-answer pairs to the user based on the plurality of similarity metrics.

In yet another aspect, a non-transitory computer-readable storage medium contains instructions that, when executed, cause one or more processors to perform operations for personalizing a self-support service in an online application, the operations including training a predictive model through a machine training process to learn a relationship between one or more user features and one or more tags based on historical user feature data; extracting a plurality of tags from the online community forum containing a plurality of question-answer pairs; creating high-dimensional representation of each tag based on a contextual relationship between each tag and other words in the online community forum by using a neural network model; mapping each respective question of the plurality of question-answer pairs to a set of tags; forming high-dimensional vectors for each respective question of the plurality of question-answer pairs by averaging the high-dimensional representation of the set of tags into a final high-dimensional vector; obtaining user data when an online user takes actions within the online application; predicting, by the predictive model, tag probabilities based on the user data for the online user by running a predictive model; putting weights on respective high-dimensional representations of each tag of the tag probabilities by respective tag probabilities; averaging the weighted high-dimensional vectors of tags of the tag probabilities into a user high-dimensional vector; calculating a plurality of similarity metrics, wherein each respective similarity metric of the plurality of similarity metrics measures the similarity between the high-dimensional vector for a respective question and the user high-dimensional vector; and providing one or more of the plurality of question-answer pairs to the user based on the plurality of similarity metrics.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for this disclosure may admit to other equally effective embodiments.

FIG. 4 illustrates an exemplary user interface (UI) screen of a tax preparation application in accordance with aspects of the present disclosure.

DETAILED DESCRIPTION

Dynamic customer segmentation can reveal insights about a customer's observed behavior and the type of behaviors that similar customers would exert under comparable circumstances. For instance, an insightful customer-based model should predict the most relevant questions that a particular group of users expects to see in the self-help panel within an online application such as TURBOTAX® (a registered trademark of Intuit, Inc.) prior to inputting any search words.

To create a capability that predicts engaging and relevant content for users, dynamic and adaptive modeling of the customer's behavior is required in relation to questions that similar users have previously shown interest in.

User similarity is defined as the overlap between the full set of features describing each user's tax profile and behavior. By segmenting customers according to their similarity in high-level dimensions, it is possible to more successfully predict the needs of the corresponding segments as related to the product under consideration.

Personalized self-support service is a capability that tackles this problem by training machine learning models to predict the most relevant set of frequently asked questions (FAQ) targeted towards distinct customer segments determined based on, e.g., user profiles. Personalized self-support service aims to establish a relationship between the users' behaviors and the most probable questions that users are likely to ask while preparing their tax returns or while preparing other standardized documents. Personalized self-support service personalizes the user experience by using a vast number of user profile features as well as clickstream data generated from user click activities within an online application (e.g., clicks on questions in an online community forum) to recommend the most relevant questions for each user. Furthermore, personalized self-support service dynamically adapts to the behavior of each user by adjusting to the clickstream activity of the user within the online application.

Figure 1:
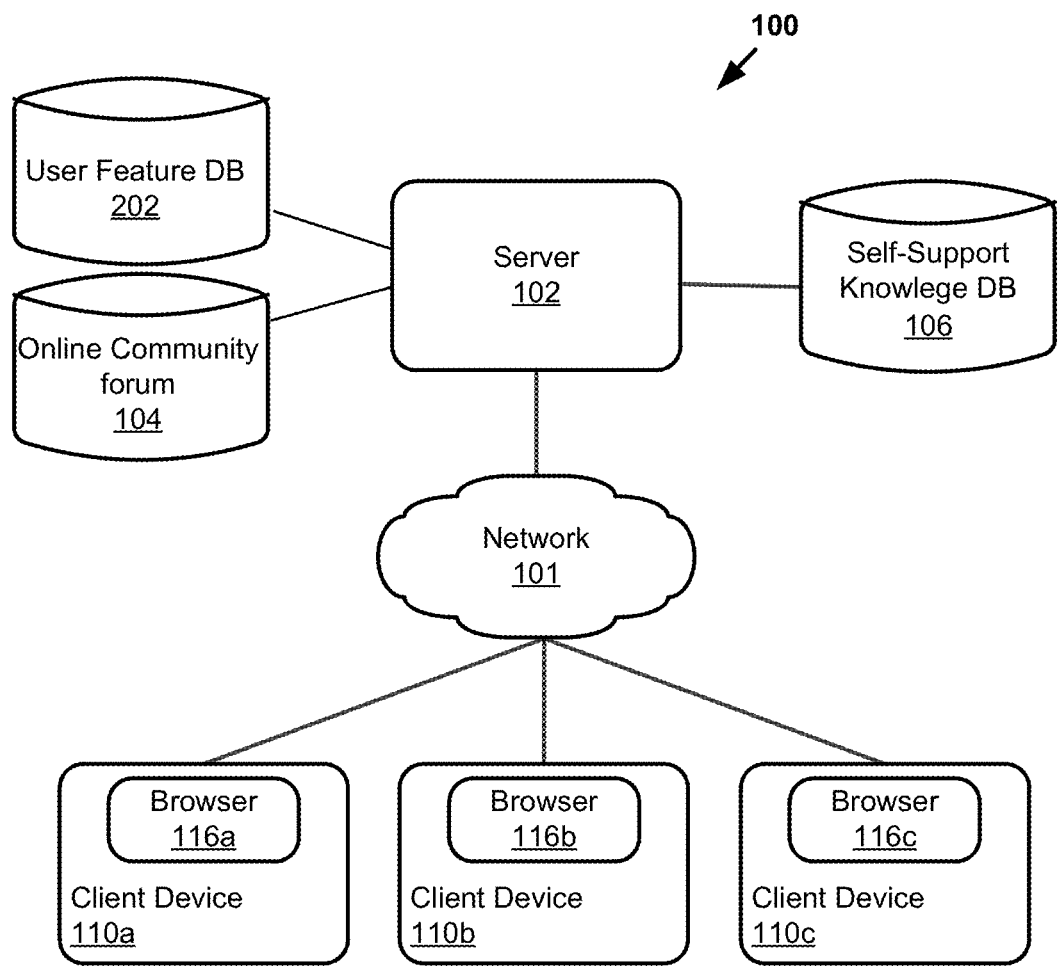
FIG. 1 illustrates an exemplary computing environment in accordance with aspects of the present disclosure.

FIG. 1 illustrates an example computing environment for providing a personalized self-support service in accordance with embodiments of present disclosure.

As illustrated, computing environment 100 includes a server 102, an online community forum 104, a self-support knowledge database 106, and a plurality of client devices 110a-c, each running a browser 116a-c (respectively). These entities in computing environment 100 are in connection with one another via a network 101, such as a local area network or wide area network (e.g., the internet). While the entities are depicted separately, certain components may be implemented either together or separately.

Server 102 comprises a physical or virtual server device (for example, in a data center) that executes online applications, including one or more services that perform functions associated with online applications (e.g., 116a-c). In some embodiments, server 102 operates a predictive model for providing personalized self-support questions and answers to each user.

Online community forum 104 can be an online support community for an online application. Online community forum 104 includes a repository storing self-support data, such as forum posts, frequently asked questions (FAQ), questions and answers, technical documentation, tutorials, wiki page entries, links to external websites, and the like.

Self-support knowledge database 106 stores the self-support data that are mapped with metadata tags in a form of high-dimensional vectors. In one embodiment, the list of the high-dimensional vectors representing each of the self-support data is stored in a form of a lookup table in server 102. Server 102 can retrieve relevant questions and answers from the self-support knowledge database 106 by consulting the lookup table.

Server 102 obtains incoming user data when a user manipulates an online application on a client device 110. In some embodiments, server 102 receives user data real-time while a user interacts with the online application. Thereafter, server 102 processes the user data and returns one or more of the most relevant question titles with their answers to the client device. For example, server 102 can provide a certain number of most relevant question titles to the client device, such as the top ten questions titles, or other numbers as necessary or available. For example, a maximum number of returned question titles may be set (e.g., ten), but there may only be five relevant question titles. In such a case, only five question titles would be returned.

Each client device 110a-c comprises a physical or virtual computing entity, such as a mobile device, a cellular phone, a smart phone, a tablet, a laptop computer, a desktop computer, a personal digital assistant (PDA), or any computing system that are equipped with browsers 116a-c, which are be used to provide a convenient interface to allow users to interact with an online application running in server 102 over network 101. A user experiencing an issue or problem with, for example, application 116a on client device 110a can seek support through the personalized self-support service implemented by server 102.

Figure 2A:
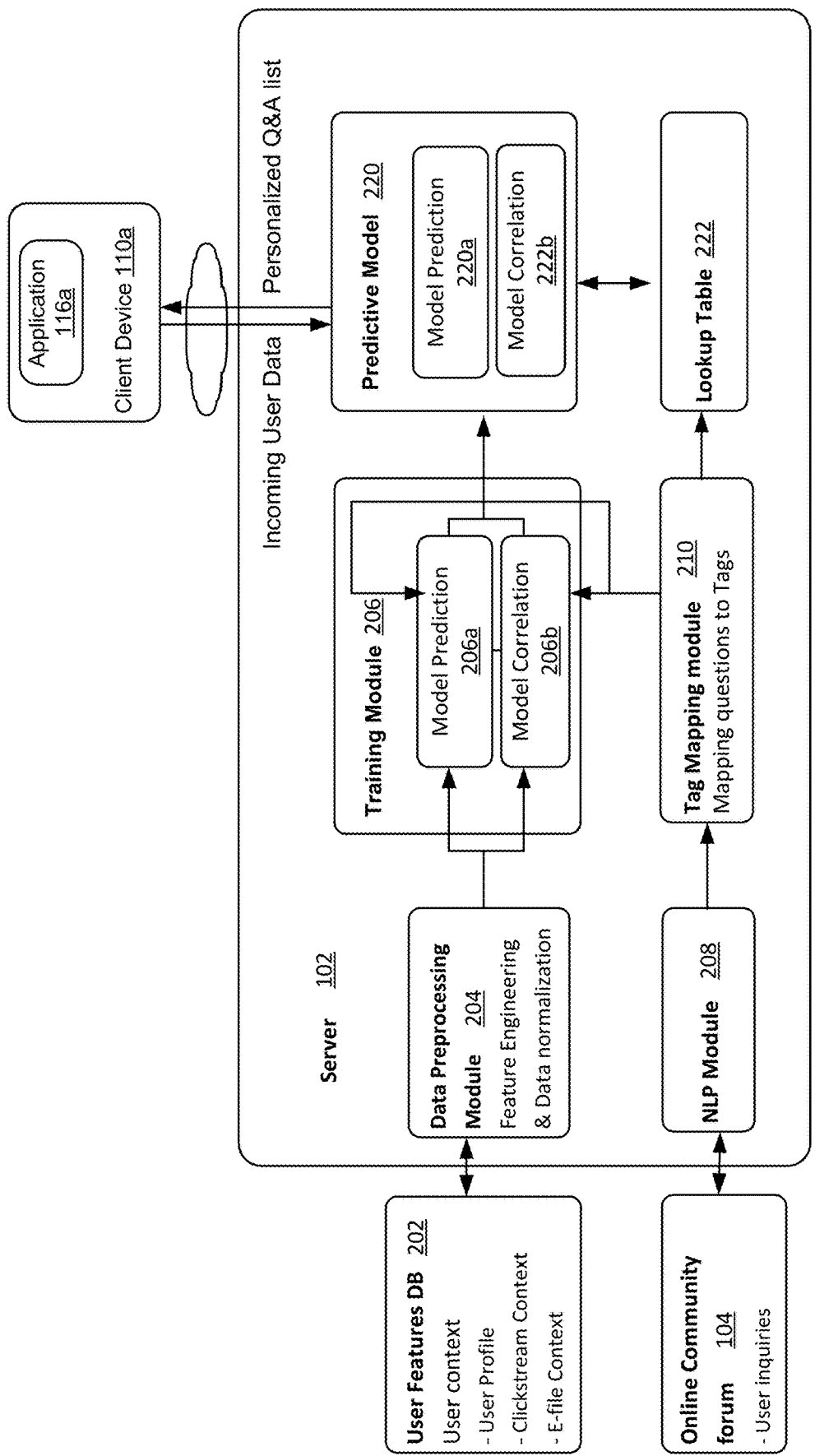
FIG. 2A illustrates an exemplary high-level structure of the server shown in FIG. 1 in accordance with aspects of the present disclosure.

FIG. 2A illustrates an exemplary high-level structure of the server 102 shown in FIG. 1 in accordance with aspects of the present disclosure. Server 102 includes a data preprocessing module 204, a natural language processing (NLP) module 208, a tag mapping module 210, a predictive model 220, and a training module 206. Predictive model 220 learns a relationship between the user features and tags through a machine training process using historical user feature data, such as that stored in user feature database 202. In one embodiment, predictive model 220 can include a random forest model that constructs a plurality of decision trees using the user feature data, and calculates a mean prediction (i.e., regression) of individual decision trees to predict tags. In some embodiments, predictive model 220 can utilize other statistical analysis models, such as Naive Bayes, a neural network, a support vector machine, boosted trees, classification and regression tress (CART), or multivariate adaptive regression splines (MARS) logistic regression.

Then, the trained predictive model predicts tags for each user based on incoming user data, using the learned relationship. In some embodiments, the operation of training the predictive model can be performed while offline, and the operation of predicting and providing personalized self-support service can be operated in real-time. In some embodiments, these components of the server can be distributed across different computing resources as part of a cloud-based computing system.

1. Data Fetching

Server 102 fetches historical user feature data from a user feature database 202. The user feature data can include user context, clickstream context, and e-file context as described in detail below.

User context includes hundreds of current and prior-year tax profile features specific to each user (e.g., income, age, number of dependents).

Clickstream context includes clicks and the click paths that users have historically taken within the product. For example, clickstream data can include a sequence of HTTP requests made by the user to an online application website, such as the TURBOTAX® website. In most cases, the requests correspond to a user clicking on a link or a button. These requests can capture the time when the users click around in the website (e.g., the help care panel), event type, the questions they click on, and the trail of user activities. When capturing activities, the data also can include the screens that users linger on and whether the user goes back and forth between certain screens, or segments in the product. In addition, clickstream data also can record the tab, subtab and information displayed on a screen, and the content (e.g., FAQs) that they click on.

E-file context includes e-file statuses that describe where in the filing process the user is at a given point in time. For example, the statuses may include: pending, prepared, succeeded agency, received, and rejected agency, among others. Timestamps may be associated with each e-file status change, such as when a user goes from a "pending" status to a "prepared" status.

Server 102 also fetches user inquiries from online community forum 104. User inquiries include historical searches and pieces of content that users clicked on in the on-line application. For example, User inquiries can include question titles as posted by application users, answers to questions from, e.g., tax experts or users, and search terms that users enter for retrieving relevant content. These data can be stored within the context of online community platforms (e.g., online community forum 104). The timestamps associated with each user activity are also retrieved to provide a sequence of behaviors by each user.

2. Data Preprocessing

Data preprocessing module 204 preprocesses the fetched user feature data before sending them to training module 206 as training data for training the predictive model. Data preprocessing module 204 can include feature engineering and data normalization processes to modify the user feature data in order to be able to be used by the machine learning training model.

In particular, if the fetched data are raw data variables, data preprocessing module 204 may transform the raw data variables into feature data that can be analyzed and utilized by the predictive model. For example, the raw data variables can be transformed into one of feature data, such as user context, clickstream data, subtab context, or e-file context.

Data preprocessing module 204 may also normalize the magnitudes of user feature data, for example to a scale between 0 and 1. Data normalization may be applied across customer segments to ensure the data variables are comparable. Individual data variables that describe customer segments. For instance, the number of customers with a "pending" e-file status who have clicked on particular question are normalized by the total number of clicks that question received from all customer segments of statuses, including: pending, prepared, succeeded agency, received, and rejected agency.

Natural Language Processing (NLP) module 208 fetches user inquiry data from online community forum 104. NLP module 208 parses, extracts and interprets meaning from the questions users click on based on the clickstream activity. This, the data stored within online community forum 104 may be leveraged to understand questions users ask at various steps within the online application. The context from the questions that users most frequently click on within the online community forum provides information about the type of topics of discussion users need help with while using various online applications, such as TURBOTAX©.

The data associated with the online community forum 104 may be processed by NLP module 208 to determine, for example, the distribution of words within the questions asked or clicked on by users. Based on user historical data, the NLP module 208 can identify the kinds of questions people clicked on within the online application through browser 116a and a related online community forum 104, and based on those identified question, define a list of words linked to users as described in detail below.

Since not all words are relevant or significant for natural language processing, the NLP module 208 ignores certain words, such as "the", "an", "with", etc., and then determines the most frequent words within the online community forum database. The NLP module may thereafter define a subset of the most frequent words in the forum 104, e.g., by counting the each occurrence of each unique word within the entire forum, then choosing the top n words as representative tags for the whole body of questions that makes up the online community forum. Here, n is any suitable positive integer, e.g., 200, for providing personalized self-support service.

For instance, a question posted in the online community forum 104, such as "can I claim my daughter", may be represented by single word tags (e.g., can, claim, daughter)—hence a 5-word question can be represented by 3 tags. In addition to representing the top words (or tags) asked in the forum, these tags also reduce the dimensionality of the representation of each question (e.g., by reducing the number of words necessary to represent the question). A user may be associated with a list of keywords or tags that summarize all the questions asked by that user. In most cases, if questions are relevant, then their answers will also be relevant. Thus, the process result for each question can be applied to their respective answers. In one embodiment, questions and their answers both can be processed for the high-dimensional presentations.

Figure 2B:
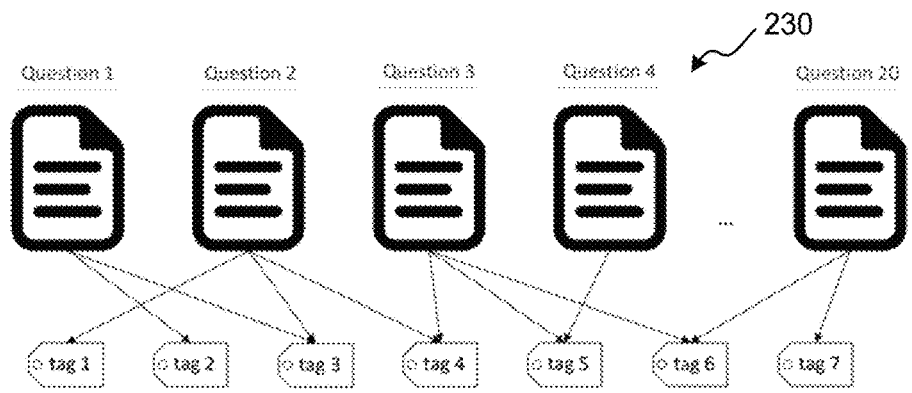
FIG. 2B illustrates an exemplary representation of questions clicked on by users in the form of tags in accordance with aspects of the present disclosure.

FIG. 2B illustrates an example representation 230 of questions clicked on by users in the form of tags in accordance with aspects of the present disclosure. As illustrated, when a user clicks on 20 questions within an online community forum while using an online application displayed on browser 116*a* in FIG. 2A, the 20 questions may be reduced to 7 tags, which are most representatives of those 20 questions. In other words, the 7 tags may reflect the most common words present within the 20 question titles. By linking the user to the 7 tags, instead of 20 questions, the dimensionality of the resulting data can be reduced, which may ease the processing necessary to determine the relationship between the user features and tags.

To enable machine comprehension of raw text, such as questions and their answers, NLP module 208 can create numerical representation of the words (e.g., tags) in the questions and answers in the form of high-dimensional vectors. Generally, a high-dimensional vector has more than 5 dimensions.

The high-dimensional representation of words in each sentence can defined by using a neural probabilistic language (NPL) model—such as word2vec. The neural probabilistic language model represents (or embeds) words in a continuous vector space where semantically similar words (i.e., words that are related in terms of their meaning within a sentence) are mapped to nearby points in a high-dimensional (e.g., 300-dimensional) coordinate system. The neural probabilistic language model uses neural networks to predict a context of words. For example, from an incoming question "can I claim my", the neural probabilistic language model predicts, e.g., "daughter" to follow in the question.

Word2vec model is trained on online community forum data containing question titles and answers to create 300-dimensional representations of the keywords (or tags) found in question titles (and answers) in the online community forum. Each keyword is represented in terms of the context of the surrounding words which it appears in through the online application forum. In other words, each keyword is represented as the probability distribution of the surrounding keywords. In the above example, for a word 'claim', the corresponding, e.g., 300-dimensional vector will capture the context of words 'can', 'I', 'my', 'daughter' (i.e., 'claim' is a word in the sentence of 'Can I claim my daughter'). By training this word2vec model, a lookup table is obtained, e.g., 500,000 keywords from online community forum that each has a 300-dimensional vector representation (500,000× 300 look up table). For example, a 300-dimensional vector for a word 'claim'=[0.05, 0.001, . . . , 0.2], where each value in the vector is related logarithmically to the probabilities computed by the output layer of a neural network in the word2vec model. The question title can be defined as a function of the tags (i.e., keywords) that are found within the actual question title or the entire question. The question title can be represented as a binary tag vector with 1s indicating when a tag is present and 0s indicating when a tag is not present.

In one embodiment, the high dimensional vectors of each keyword in a question title are averaged into a final high dimensional vector for representing the question title. The final high-dimensional vectors representing each of a plurality of questions can be stored in a lookup table. As an example, the average 300-dimensional vector computed for the question title comprising of 'can' 'I' 'claim' 'my', 'daughter' is:

weighted average vector=([300×1 vector of 'can']+
[300×1 vector of 'I'][300×1 vector of 'claim']+
[300×1 vector of 'my']+[300×1 vector of
'daughter'])/5(the number of tags).

Finally, the calculated weighted average vector becomes a high-dimensional vector for the question title.

The raw text that is used to train the neural probabilistic language model is retrieved from the online community forum, which includes both questions from customers, and answers from experts. By including the answers in the model, it is possible to get a better understanding of the distribution of words that make up each question and the contextual understanding of a specific subject matter, such as tax.

Figure 2C:
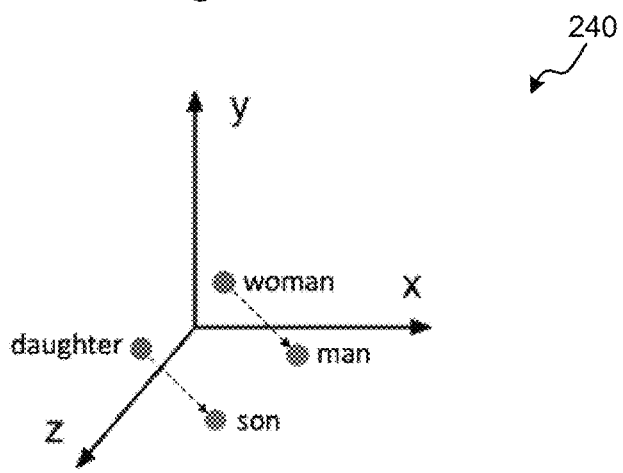
FIG. 2C illustrates exemplary vector representations of learned relations between words in accordance with aspects of the present disclosure.

FIG. 2C illustrates exemplary vector representations 240 of learned relations between words in accordance with aspects of the present disclosure. FIG. 2C shows two learned vector representations between words 'woman' and 'man', and 'daughter' and 'son' from the neural probabilistic language model. The direction of the vectors illustrates the semantic relationship between the words, e.g., male-female. For illustration purposes, the vector representation is projected down to 3-dimensional vectors for each word. However, the words from the neural probabilistic language model can be represented by high-dimensional vectors e.g., 300-dimensional vectors.

The high-dimensional vectors are used to represent each one of the top, e.g., 200 tags. This representation allows the high-level semantic understanding of the tags, which is a key for machines to grasp the contextual understanding of text. These high-dimensional vectors encode unique weights for keywords (i.e., tags) in the form of tag probabilities (the higher the tag probability associated with each word, the greater the similarity between the text and the keyword) such that a predictive model can automatically distinguish between the representation of similar and dissimilar keywords that make up the questions. Each tag (or word) has a tag probability that describes the likelihood of that particular tag being related to a user. In addition, tag probabilities can be represented as a function of the topics, or the "theme" of each question. Topics can be identified by a combination of a plurality of tags.

3. Predictive Model Training

The server 102 operates a predictive model 220 for personalizing the self-help experience, and a training module 206 for training the predictive model 220 through a machine learning process using historical data. The training module 206 can include a model prediction module 206a for predicting tags from the user feature data and a model correlation 206b for correlating the user segment with tags. In one embodiment, the predicted tags are related to the user feature data, and correlated tags are related to the user segment. Once the training process of the model prediction and correlation is complete, the predictive model 220 can merge the predicted tags and correlated tags and generate a respective high-dimensional vector for each object of user feature data.

Training module 206 uses user feature data, e.g., stored in user feature database 202, to establish relationships between the user's behavior and the types of questions. For example, the machine learning training module 206 can use the user's tax profile data and clickstream data to further influence the types of questions that best suit the user.

Training module 206 trains a model prediction 206a and a model correlation 206b to implement user profile features from user context, clickstream data, and e-file status to provide a personalized experience in reference to the type of content that is of most interest to the different customer segments in user inquiries.

Model prediction 206a utilizes each user's profile feature to provide a unique user experience for each user. This is done by tailoring the types of questions that the users see in the self-help panel based on their features. In other words, the data that the user has entered in his profile is used to predict the most likely list of tags associated with the customer segment that he is part of.

In addition to user profile features, the clickstream data from each user is grouped into events that describe the user activity within an application, such as TURBOTAX®. As mentioned above, an event is an activity or action, associated with the user that can capture the user's behavior while using a software application. Some of the informative events for predicting the question tags can be extracted from the help care panel displayed on a screen of the online application, e.g., the number of clicks on certain questions presented in the panel, or the time spent on a certain screen, tab, subtab, and the like. This is accomplished, for example, by building machine learning capabilities that intake current and prior year features for users who have previously searched or clicked on domain specific content within the online community forum.

Furthermore, additional events are revealed from the clicks on the "contact us" button or "like" button, and those events provide information about the probability that the user needs help and whether certain content was helpful or not.

The relationship between the user's data (e.g., profile features and event summaries) and tags is established using a decision tree regression, which learns the relationship between the features and tags, which then maps tags to the questions that a user has clicked on in the past. During runtime, this learned relationship is used to predict the tag probabilities for each online user leveraging user's feature data. The higher the probability associated with each tag, the greater the likelihood of that user to be linked to question titles that contain the corresponding tags.

One effective way for predicting the question tags is by analyzing a user's clicks on the question links presented in the help care panel of the online application (in which a list of self-support questions are displayed). From these question links, the model prediction 206a extracts the tags associated with what the user clicked on to identify the user's interest in a certain topic. This way, when the model prediction 206a computes the probabilities associated with each tag, it places more weight on tags related to content that the user has previously clicked on. Also, the clicks on the question links provide a strong indication about the type of content that the user is interested in and would find most helpful. Furthermore, clicks on the "contact us" button, chat bot and "like" button provide an indication about the probability that the user needs help and whether certain content was helpful or not to the user, as well as the sentiment of the user associated with certain forms of help, or content.

Model prediction 206a determines how the user features and clickstream events relate to the tags associated with each user. This enables the model prediction 220a to predict the tag probabilities given a set of user features and clickstream data. The model prediction 206a provides insights into the type of topics that each individual is most likely to query or click on.

Model correlation 206b establishes correlations between question tags and the context of tabs, subtabs, screens, and individual e-file statuses that users have historically been associated with. Thus, the model correlation defines tag probabilities related to the topics associated with each user.

For each context, model correlation 206b models the probabilities linked to each tag, based on the number of customers and their historical behavior within that context. For instance, users may be likely to ask about income tax in the "Federal Tax" tab when they have a "pending" e-file status. For example, the following tags and their probabilities may be related to a segment of users who clicked on content in the "Federal Tax" tab: federal with probability 0.9; taxes with probability 0.9; file with probability 0.8; income with probability 0.7; etc. In some examples, the tags and their associated probabilities may be stored in a one-dimensional array, such as a vector. For example, the vector may have a set format of alternating tags and probabilities within the vector elements. In other examples, the tags and their associated probabilities may be stored in a multi-dimensional array, such as a matrix.

Notably, the previous example with respect to the Federal Tax tab context is just one example. The correlation process can be applied to any other context, such as other tabs within the online application. Thus, using the correlation process, it is possible to predict a list of tags for each user based on a learned model from historical data.

Another important feature can be computed from the clickstream data, namely the time spent on a screen, tab or subtab. Once the model prediction 206a predicts the tags, the model correlation 206b identifies the most relevant topics of questions for users who spend various amounts of time on a screen. The time information teaches the model correlation 206b about the type of topics that customers are most interested in based on the time they spend on a screen.

The time that it takes users to go through a screen, tab or subtab can be indicative of whether users face any difficulty with navigating through the product, or might have questions with topics in the online application that they spend a long time hovering over.

3. Mapping Questions to Tags

In addition to preprocessing user inquires, NLP module 208 also can retrieve question-answer pairs from the online community forum (e.g., online community forum), extract the keywords, and analyze their contexts.

Tag mapping module 210 leverages the NLP capability from NLP module 208 to create a mapping between each question asked in the online community forum and the tags for encoding each question. In some examples, the questions in the online community forum 104 are associated with a set of the highest frequency tags occurring within the question text. Then, each set of high frequency tags associated with a question is transformed into a high-dimensional representation, such as a representation defined by a neural probabilistic language (NPL) model (e.g., word2vec). In some examples, each question in the forum is represented by a unique vector. Further, each unique vector may be stored in a lookup table, such as lookup table 222 of FIG. 2A.

The data preprocessing module 204, NLP module 208, tag mapping module 210, and training module 206 do not necessarily require real-time capability to make predictions associated with each user; instead, these module can be trained on historical data to model the types of questions users have asked in the past in relation to their features from user context, clickstream data, and subtab context, among others.

4. Trained Predictive Model

Trained predictive model 220 can be formed by merging, for each user, the predicted tags generated from model prediction 220a, with the correlated tags generated from model correlation 220b to assign personalized and relevant tags to each user. Then, the server identifies a number of questions related to the personalized tags for each user. This way, each user is mapped to a list of highly relevant and popular questions based on learnings extracted from the customers as segmented by their features, such as a user profile, clickstream, e-file status and user inquiry.

Predictive model 220 calculates relevancies between the high-dimensional vector of tag probabilities for a current user, and the high-dimensional vectors for each of the questions stored in the lookup table 222. Subsequently, trained predictive model 220 ranks the questions in the lookup table in order of relevancy. Thereafter, trained predictive model 220 can return a certain number of the most relevant question titles to a client device for presentation to each user.

Figure 2D:
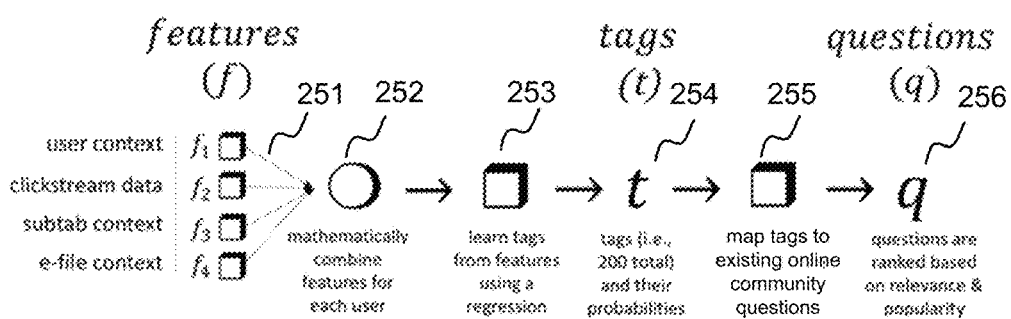
FIG. 2D illustrates an exemplary flow diagram for operating a trained predictive model in accordance with aspects of the present disclosure.

FIG. 2D illustrates an exemplary flow diagram 250 for operating a predictive model 220 in accordance with aspects of the present disclosure.

Flow diagram 250 begins with obtaining incoming user data when a user uses the online application, such as an online tax preparation application, at step 251. The incoming user data includes at least one of user context ($f_1$), clickstream data ($f_2$), subtab context ($f_3$) and e-file context ($f_4$). The incoming user data are pre-processed and then combined to learn a list of tags for each individual (e.g., using a regression) at steps 252 and 253. The number of tags is not limited and can be any suitable number, such as 50, 100, 300, and so on, to support a personalized self-support service. This is done for all users in the database, allowing the predictive model to understand the relationship between features and tags with probabilities across customer segments.

The learned relationship between the user features and tags during training may be used to predict tag probabilities for each user. After the tags are learned for each user, users are each represented as high-dimensional (e.g., 300-dimensional) vectors generated using word2vec, and averaged to a final high-dimensional vector.

The final high-dimensional vectors representing each question (and its answer) are then mapped to a lookup table at step 255.

Figure 3:
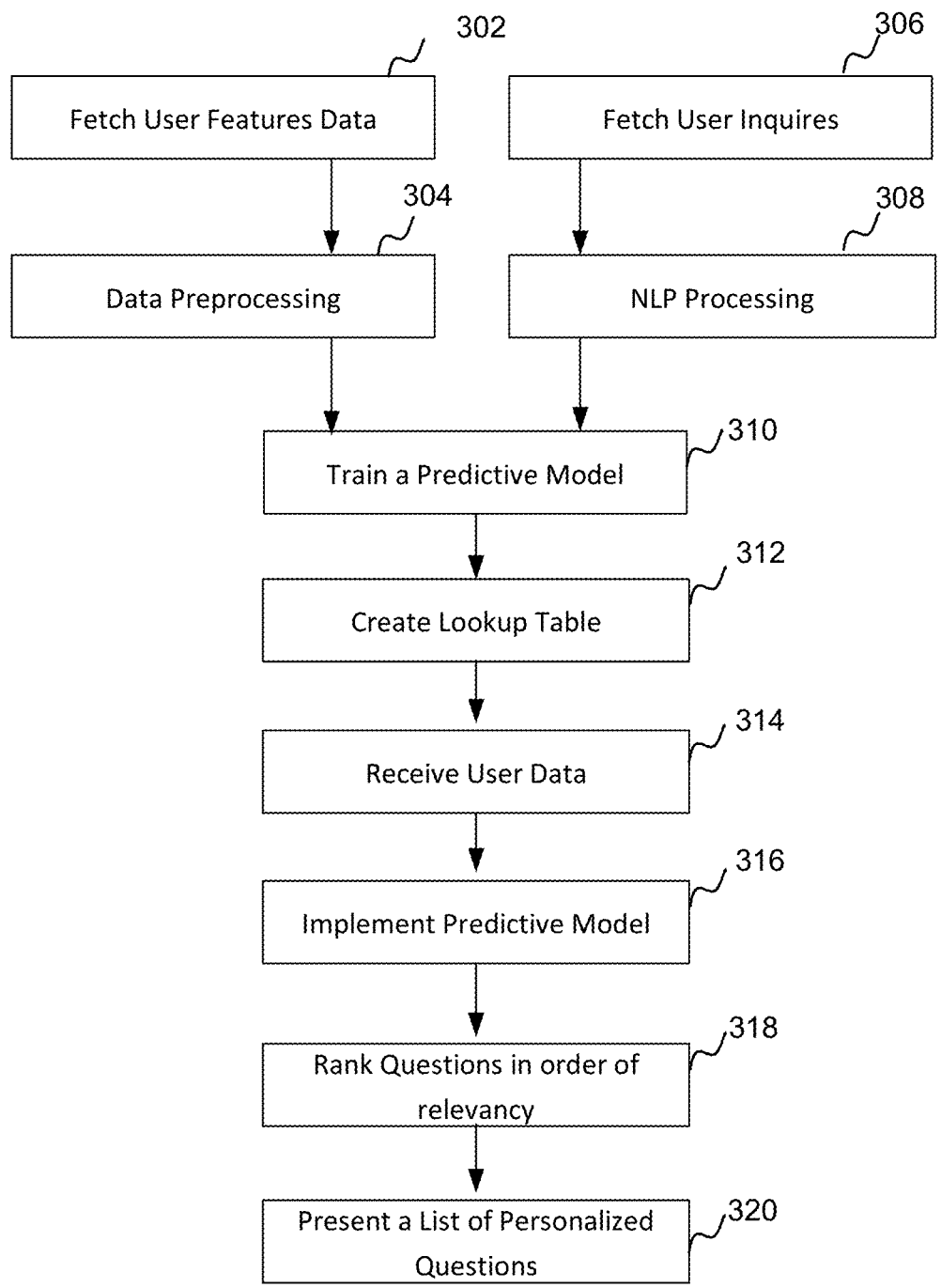
FIG. 3 illustrates an exemplary flowchart for personalizing the self-help experience in accordance with aspects of the present disclosure.

Questions in the lookup table are ranked in order of relevancy to incoming user data at step 256. For example, a number (e.g., 10) of the question title vectors that have the smallest angle from the user vector in terms of cosine similarity may be selected as most relevant to the user. Thereafter, those questions may be returned for the user FIG. 3 illustrates an exemplary flowchart 300 for personalizing the self-help experience in accordance with aspects of the present disclosure. Flowchart 300 can be implemented by the server 102 of FIG. 2A. FIG. 3 illustrates the functionality and operation of possible implementations of systems, methods and computer program products according to various embodiments of the present disclosure. In this regard, each block in the flowchart may represent a module, segment, or portion of code, which comprises one or more executable instructions for implementing the specified logical function(s). In some alternative implementations, the functions noted in the block may occur simultaneously, substantially concurrently, or out of the order noted in the figure. Each block of the flowchart and combinations of blocks in the flowchart can be implemented by special-purpose hardware-based systems that perform the specified functions or acts, or combinations of special purpose hardware and computer instructions.

At step 302, the server fetches historical user feature data from a database, such as user feature database 202 of FIG. 2A. The historical user feature data may include user context, clickstream context, e-file context, and the like. Then, the fetched data are preprocessed to be used as training data for training the predictive model at step 304.

At step 306, the server also fetches historical user inquiries, which may include, for example, historical searches and pieces of questions that users clicked on in an online community platform, such as online community forum 104 of FIG. 2A. Subsequently, the server performs natural language processing on the historical user inquiries to parse, extract, and interpret meaning from historical user inquiries at step 308. Also, the server extracts self-support data sets (e.g., question and answer pairs) from the online community forum using natural language processing. The subject and details of questions may be identified along with a summary or totality of an answer to the question. The server may also associate metadata with the question-answer pairs, such as tags identifying topics.

At step 310, the server trains a predictive model, such as predictive model 220 in FIG. 2A, to learn a relationship between user features and tags with their probabilities based on historical user feature data. The predictive model predicts tags (e.g., via model prediction 206a) and their probabilities from the user feature data also correlates (e.g., via model correlation 206b) the user feature data with tags and their probabilities. The predictive model can merge the predicted tags and correlated tags, and generate high-dimensional vectors for each of user feature data.

At step 312, the high-dimensional (e.g., 300 dimensional) vectors for question titles can be stored in a large size lookup table.

At step 314, the server obtains incoming user data (e.g., in real-time while a user uses the online application). The incoming user data can be generated based on user's activities within the online application and may include a user profile, clickstream data, and e-file status, among other things. The incoming user data also may also include the user's search inquiries and pieces of content that the user clicks on in the online community platform that is associated with the online application.

At step 316, the predictive model predicts tags and their probabilities from the incoming user data, using the learned relationship established through training the predictive model. In some embodiments, some type of the incoming user data, such as user inquiries, can be processed and parsed to extract tags therefrom, using the natural language processing.

The predictive model predicts tag probabilities for an online user using the learned relationship between the user features and tags. Then, a tag vector comprising of predicted tag probabilities is assigned to the online user, and the high-dimensional representations from word2vec are retrieved for each tag (or word). Subsequently, the weighted average vector is computed using the tag probabilities and the high-dimensional vectors. In one embodiment, by averaging the 300-dimensional vectors across all of tag probabilities which are predicted for the online user, a 300×1 final vector is obtained.

As an example, assume that the following probability tag vector is predicted for an online user:

tag1 tag2 . . . tag200
Predicted tag probability vector=[1, 0.8 . . . , 0.5]
Here, each tag has a high-dimensional representation generated from word2vec as described above in association with FIG. 2B. For example, tag1 can be 'claim' which has a form of a 300-dimensional representation generated from word2vec. The average 300-dimensional vector computed for the 200-tag probabilities is:

$$\text{weighted average vector} = ([300 \times 1 \text{ vector of tag } 1] \times 0.1 + [300 \times 1 \text{ vector of tag } 2] \times 0.8 + \ldots + [\text{vector of tag200}] \times 0.5)/(0.1 + 0.8 + \ldots + 0.5).$$

Finally, the calculated weighted average vector becomes a high-dimensional vector for the online user.

At step 318, the predictive model also can calculate relevancies (or similarities) between the high-dimensional vector of tag probabilities for the user, and the high-dimensional vectors for each of the questions stored in the lookup table. Subsequently, the questions stored in the lookup table may be ranked in order of relevancy to the user based on the user's high-dimensional vector of tag probabilities. In some embodiments, the relevance can be defined as a similarity score, which is an angle between two high-dimensional vectors in terms of cosine similarity where smaller angles represent larger relevancies.

At step 320, the server returns a number of the most relevant question titles to the online application displayed on browser 116a on client device 110a in FIG. 2A. For example, the server may returns 10 of the most relevant question titles, based on those question title vectors having the smallest angle relative to the user's vector.

FIG. 4 illustrates an exemplary user interface (UI) screen of a tax preparation application in accordance with aspects of the present disclosure.

The screen 400 includes multiple tabs including Home, Personal info, Federal Taxes, State Taxes, and eFile. By choosing one of these tabs, a user can navigate the UI screen to prepare and file a tax return. The UI screen also includes a self-support section 402 in which personalized and relevant topics are displayed, for example, in a form of questions and answers (Q&A).

As a user take actions within the UI screen of the online tax preparation application, the server obtains incoming user data including user context (e.g., profile), clickstream context, e-file context (e.g., status) and the like. Server 102 calculates relevancies of the questions stored in the lookup table and returns the most relevant topics (e.g., question titles) for the user. The UI screen displays the relevant topics in the self-support section.

Figure 5:
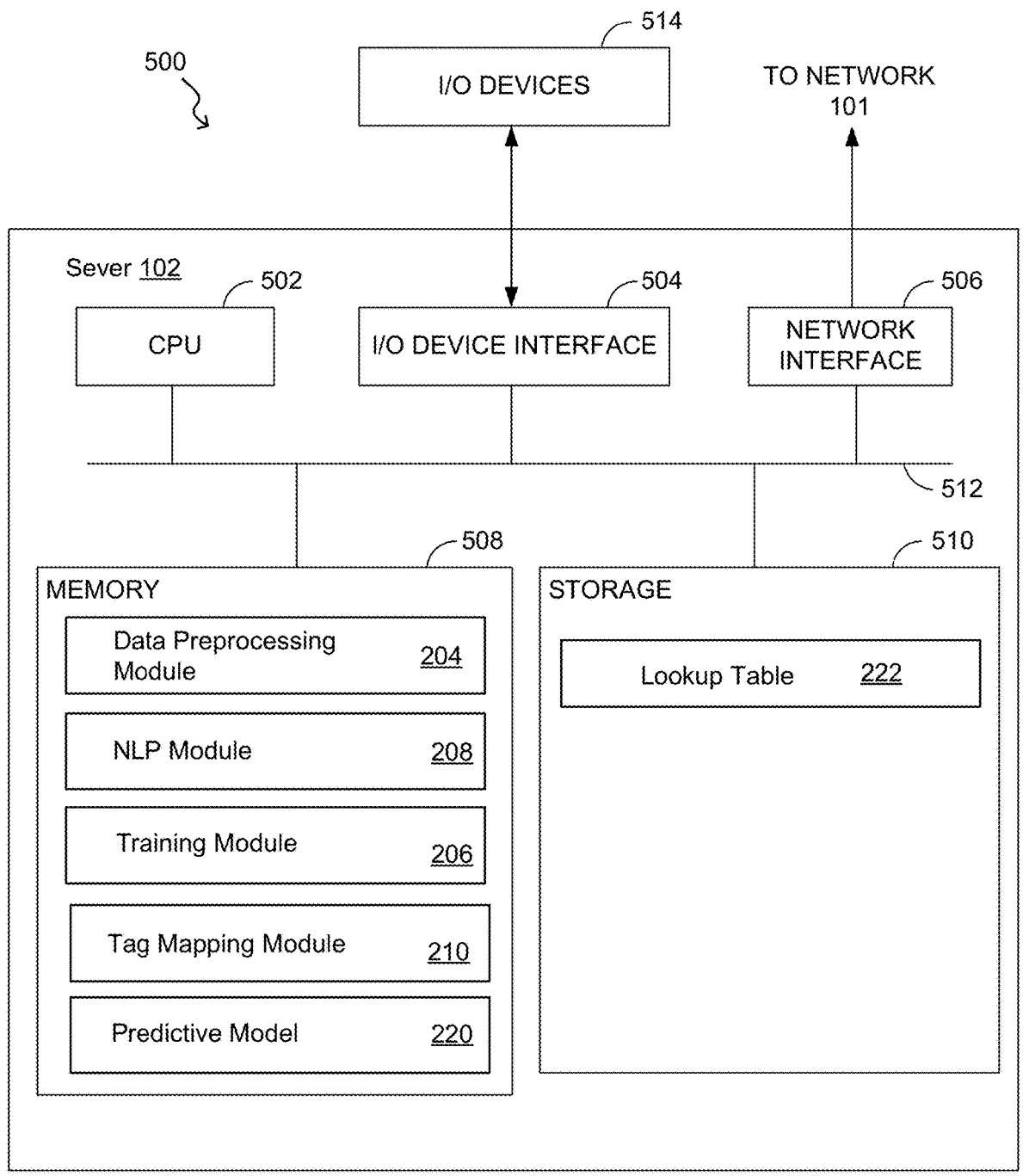
FIG. 5 illustrates a computer system with which some embodiments of the present disclosure may be implemented.

FIG. 5 illustrates an exemplary internal structure 500 of server 102 that assigns personalized and relevant topics to each user in accordance with aspects of the present disclosure. As shown, the server 102 includes a central processing unit (CPU) 502, one or more I/O device interfaces 504, which may allow for the connection of various I/O devices (e.g., keyboards, displays, mouse devices, pen input, etc.) to server 102, network interface 506 (which may include a transmitter for transmitting data and a receiver for receiving data), memory 508, storage 510, and interconnect 512. Storage 510 can locate either inside or outside the server 102. When the storage locates outside server 102, the storage can be connected via the network 101.

CPU 502 may retrieve and execute programming instructions stored in the memory 508. Similarly, CPU 502 may retrieve and store application data residing in the memory 508. Interconnect 512 transmits programming instructions and application data, among the CPU 502, I/O device interface 504, network interface 506, memory 508, and storage 510. CPU 502 can represent a single CPU, multiple CPUs, a single CPU having multiple processing cores, and the like. Additionally, memory 508 may represent volatile memory, such as random access memory. Furthermore, storage 510 may represent non-volatile memory, such as memory on a disk drive. Although shown as a single unit, storage 510 may be a combination of fixed or removable storage devices, such as fixed disc drives, removable memory cards or optical storage, network attached storage (NAS), or a storage area-network (SAN).

As shown, memory 508 stores programming instructions for executing data preprocessing module 204, NLP module 208, training module 206, tag mapping module 210 and predictive model 220. Storage 510 stores a lookup table 222. Data preprocessing module 204 fetches historical user feature data from a database, and preprocesses the fetched data to be used as training data for training the predictive model 220. NLP module 208 performs natural language processing on historical user inquiries to parse and extract tags from the questions users click on based on the clickstream activity. Training module 206 trains a predictive model 220 to learn a relationship between user features and tags with their probabilities through a machine training process using historical user feature data. Tag mapping module 221 associates metadata such as tags identifying topics, with the question-answer pairs. Predictive model 220 predicts tags and their probabilities from the user features data. Predictive model 220 also can correlate the user feature data with tags and their probabilities, using the learned relationship. Predictive model 220 returns a certain number of the most relevant question titles to the client device for each user.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for providing a personalized self-support service, comprising:
    extracting a plurality of tags from an online community forum containing a plurality of question-answer pairs;
    creating multi-dimensional representations of the plurality of tags based on a contextual relationship of each tag of the plurality of tags within the online community forum by using a neural network model that was trained based on contextual data associated with keywords in historical questions posted to the online community forum, wherein the contextual data is based on historical answers provided in response to the historical questions;
    mapping each respective question of the plurality of question-answer pairs to a set of tags;
    forming a respective multi-dimensional vector for each respective question of the plurality of question-answer pairs by averaging a respective subset of the multi-dimensional representations of the plurality of tags that corresponds to the set of tags mapped to the respective question;
    obtaining user data based on a user performing one or more actions within an application associated with the online community forum;
    predicting tag probabilities for the user based on the user data using a predictive model that has been trained through a machine training process to learn relationships between user features and tags based on historical associations between the user features and the tags;
    assigning weights to respective multi-dimensional representations of respective tags associated with the tag probabilities based on the tag probabilities to produce weighted multi-dimensional tag representations;
    averaging the weighted multi-dimensional tag representations to produce a user multi-dimensional vector;
    calculating a plurality of similarity metrics, wherein each respective similarity metric measures a respective similarity between the respective multi-dimensional vector for a respective question and the user multi-dimensional vector;
    selecting a subset of the plurality of question-answer pairs based on the plurality of similarity metrics; and
    providing the subset of the plurality of question-answer pairs to the user via a user interface.

2. The method of claim 1, wherein the user features are based on at least one of user profiles, clickstreams, electronic filing statuses, a tab or subtab selection on a web page of the application, or user inquiries.

3. The method of claim 2, wherein the user features are normalized to a magnitude scale between 0 and 1.

4. The method of claim 1, wherein each respective question of the plurality of question-answer pairs is parsed to extract tags therefrom through natural language processing.

5. The method of claim 1, wherein the neural network model comprises a neural probabilistic language model.

6. The method of claim 1, further comprising establishing correlations between certain tags of questions in the question-answer pairs and subtab context or an electronic filing status associated with the user, wherein the user multi-dimensional vector is further based on the correlations.

7. The method of claim 1, wherein each similarity metric of the plurality of similarity metrics is determined based on cosine similarity.

8. A non-transitory computer-readable storage medium containing instructions that, when executed by one or more processors of a computing system, cause the computing system to:
    extract a plurality of tags from an online community forum containing a plurality of question-answer pairs;
    create multi-dimensional representations of the plurality of tags based on a contextual relationship of each tag of the plurality of tags within the online community forum by using a neural network model that was trained based on contextual data associated with keywords in historical questions posted to the online community forum, wherein the contextual data is based on historical answers provided in response to the historical questions;
    map each respective question of the plurality of question-answer pairs to a set of tags;
    form a respective multi-dimensional vector for each respective question of the plurality of question-answer pairs by averaging a respective subset of the multi-dimensional representations of the plurality of tags that corresponds to the set of tags mapped to the respective question;

obtain user data based on a user performing one or more actions within an application associated with the online community forum;

predict tag probabilities for the user based on the user data using a predictive model that has been trained through a machine training process to learn relationships between user features and tags based on historical associations between the user features and the tags;

assign weights to respective multi-dimensional representations of respective tags associated with the tag probabilities based on the tag probabilities to produce weighted multi-dimensional tag representations;

average the weighted multi-dimensional tag representations to produce a user multi-dimensional vector;

calculate a plurality of similarity metrics, wherein each respective similarity metric measures a respective similarity between the respective multi-dimensional vector for a respective question and the user multi-dimensional vector;

select a subset of the plurality of question-answer pairs based on the plurality of similarity metrics; and provide the subset of the plurality of question-answer pairs to the user via a user interface.

9. The non-transitory computer-readable storage medium of claim 8, wherein the user features are based on at least one of user profiles, clickstreams, electronic filing statuses, a tab or subtab selection on a web page of the application, or user inquiries.

10. The non-transitory computer-readable storage medium of claim 9, wherein the user features are normalized to a magnitude scale between 0 and 1.

11. The non-transitory computer-readable storage medium of claim 8, wherein each respective question of the plurality of question-answer pairs is parsed to extract tags therefrom through natural language processing.

12. The non-transitory computer-readable storage medium of claim 8, wherein the neural network model comprises a neural probabilistic language model.

13. The non-transitory computer-readable storage medium of claim 8, further comprising establishing correlations between certain tags of questions in the question-answer pairs and subtab context or an electronic filing status associated with the user, wherein the user multi-dimensional vector is further based on the correlations.

14. The non-transitory computer-readable storage medium of claim 8, wherein each similarity metric of the plurality of similarity metrics is determined based on cosine similarity.

15. A system for personalizing a self-support service, comprising:

one or more processors; and a memory comprising instructions that, when executed by the one or more processors, cause the system to:

extract a plurality of tags from an online community forum containing a plurality of question-answer pairs;

create multi-dimensional representations of the plurality of tags based on a contextual relationship of each tag of the plurality of tags within the online community forum by using a neural network model that was trained based on contextual data associated with keywords in historical questions posted to the online community forum, wherein the contextual data is based on historical answers provided in response to the historical questions;

map each respective question of the plurality of question-answer pairs to a set of tags;

form a respective multi-dimensional vector for each respective question of the plurality of question-answer pairs by averaging a respective subset of the multi-dimensional representations of the plurality of tags that corresponds to the set of tags mapped to the respective question;

obtain user data based on a user performing one or more actions within an application associated with the online community forum;

predict tag probabilities for the user based on the user data using a predictive model that has been trained through a machine training process to learn relationships between user features and tags based on historical associations between the user features and the tags;

assign weights to respective multi-dimensional representations of respective tags associated with the tag probabilities based on the tag probabilities to produce weighted multi-dimensional tag representations;

average the weighted multi-dimensional tag representations to produce a user multi-dimensional vector;

calculate a plurality of similarity metrics, wherein each respective similarity metric measures a respective similarity between the respective multi-dimensional vector for a respective question and the user multi-dimensional vector;

select a subset of the plurality of question-answer pairs based on the plurality of similarity metrics; and provide the subset of the plurality of question-answer pairs to the user via a user interface.

16. The system of claim 15, wherein the user features are based on at least one of user profiles, clickstreams, electronic filing statuses, a tab or subtab selection on a web page of the application, or user inquiries.

17. The system of claim 16, wherein the user features are normalized to a magnitude scale between 0 and 1.

18. The system of claim 15, wherein each respective question of the plurality of question-answer pairs is parsed to extract tags therefrom through natural language processing.

19. The system of claim 16, further comprising establishing correlations between certain tags of questions in the question-answer pairs and subtab context or an electronic filing status associated with the user, wherein the user multi-dimensional vector is further based on the correlations.

20. The system of claim 16, wherein each similarity metric of the plurality of similarity metrics is determined based on cosine similarity.

* * * * *